(12) United States Patent
Tarra et al.

(10) Patent No.: US 8,041,988 B2
(45) Date of Patent: Oct. 18, 2011

(54) FIRMWARE UPDATE FOR CONSUMER ELECTRONIC DEVICE

(75) Inventors: Raghuveer Tarra, Cupertino, CA (US); Harsha Saagi, Bangalore (IN)

(73) Assignee: Sling Media Inc., Foster City, CA (US)

( * ) Notice: Subject to any disclaimer, the term of this patent is extended or adjusted under 35 U.S.C. 154(b) by 0 days.

(21) Appl. No.: 12/757,714

(22) Filed: Apr. 9, 2010

(65) Prior Publication Data

US 2010/0192007 A1 Jul. 29, 2010

Related U.S. Application Data

(63) Continuation of application No. 11/428,254, filed on Jun. 30, 2006, now Pat. No. 7,702,952.

(60) Provisional application No. 60/696,096, filed on Jun. 30, 2005.

(51) Int. Cl.
*G06F 11/00* (2006.01)

(52) U.S. Cl. ........................ 714/6.11; 714/6.12; 717/168

(58) Field of Classification Search .................. 714/6, 7, 714/36, 6.11, 6.12, 6.3, 6.32; 717/168
See application file for complete search history.

(56) References Cited

U.S. PATENT DOCUMENTS

| | | | |
|---|---|---|---|
| 3,416,043 A | 12/1968 | Jorgensen | |
| 4,254,303 A | 3/1981 | Takizawa | |
| 5,161,021 A | 11/1992 | Tsai | |
| 5,237,648 A | 8/1993 | Mills et al. | |
| 5,386,493 A | 1/1995 | Degen et al. | |
| 5,434,590 A | 7/1995 | Dinwiddie, Jr. et al. | |
| 5,493,638 A | 2/1996 | Hooper et al. | |
| 5,602,589 A | 2/1997 | Vishwanath et al. | |
| 5,661,516 A | 8/1997 | Carles | |
| 5,666,426 A | 9/1997 | Helms | |
| 5,682,195 A | 10/1997 | Hendricks et al. | |
| 5,706,290 A | 1/1998 | Shaw et al. | |
| 5,708,961 A | 1/1998 | Hylton et al. | |
| 5,710,605 A | 1/1998 | Nelson | |
| 5,722,041 A | 2/1998 | Freadman | |
| 5,757,416 A | 5/1998 | Birch et al. | |
| 5,774,170 A | 6/1998 | Hite et al. | |
| 5,778,077 A | 7/1998 | Davidson | |

(Continued)

FOREIGN PATENT DOCUMENTS

CN 1464685 A 12/2003

(Continued)

OTHER PUBLICATIONS

China State Intellectual Property Office "First Office Action," issued Jul. 31, 2009, for Application No. 200580026825.X.

(Continued)

*Primary Examiner* — Joshua Lohn
(74) *Attorney, Agent, or Firm* — Ingrassia Fisher & Lorenz, P.C.

(57) ABSTRACT

To update firmware on a consumer device intelligently, two or more application images are stored as firmware on the consumer device. If the primary application image is corrupt, the back-up application image is executed on the consumer device. The back-up application image can be updated based on the primary application image. User configuration files can be preserved during the update of an application image, or they can be overwritten. This firmware updating scheme can be advantageously implemented in a personal media broadcasting system.

20 Claims, 4 Drawing Sheets

U.S. PATENT DOCUMENTS

| | | |
|---|---|---|
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,117,482 B2 * | 10/2006 | Nguyen et al. ............... 717/122 |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | Dacosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,555,640 B2 * | 6/2009 | Helvick ............................. 713/1 |
| 7,565,681 B2 | 7/2009 | Ngo et al. |
| 7,603,440 B1 * | 10/2009 | Grabowski et al. ........... 709/220 |
| 7,818,556 B2 * | 10/2010 | Iima et al. ......................... 713/1 |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143973 A1 | 10/2002 | Price |
| 2002/0147634 A1 | 10/2002 | Jacoby et al. |

| | | | | | | |
|---|---|---|---|---|---|---|
| 2002/0147687 A1 | 10/2002 | Breiter et al. | | 2008/0134267 A1 | 6/2008 | Moghe et al. |
| 2002/0167458 A1 | 11/2002 | Baudisch et al. | | 2008/0195744 A1 | 8/2008 | Bowra et al. |
| 2002/0188818 A1 | 12/2002 | Nimura et al. | | 2008/0199150 A1 | 8/2008 | Candelore |
| 2002/0191575 A1 | 12/2002 | Kalavade et al. | | 2008/0256485 A1 | 10/2008 | Krikorian |
| 2003/0001880 A1 | 1/2003 | Holtz et al. | | 2008/0294759 A1 | 11/2008 | Biswas et al. |
| 2003/0028873 A1 | 2/2003 | Lemmons | | 2008/0307456 A1 | 12/2008 | Beetcher et al. |
| 2003/0065915 A1 | 4/2003 | Yu et al. | | 2008/0307462 A1 | 12/2008 | Beetcher et al. |
| 2003/0093260 A1 | 5/2003 | Dagtas et al. | | 2008/0307463 A1 | 12/2008 | Beetcher et al. |
| 2003/0095791 A1 | 5/2003 | Barton et al. | | 2009/0074380 A1 | 3/2009 | Boston et al. |
| 2003/0115167 A1 | 6/2003 | Sharif et al. | | 2009/0080448 A1 | 3/2009 | Tarra et al. |
| 2003/0159143 A1 | 8/2003 | Chan | | 2009/0102983 A1 | 4/2009 | Malone et al. |
| 2003/0187657 A1 | 10/2003 | Erhart et al. | | 2009/0103607 A1 | 4/2009 | Bajpai et al. |
| 2003/0192054 A1 | 10/2003 | Birks et al. | | 2009/0157697 A1 | 6/2009 | Conway et al. |
| 2003/0208612 A1 | 11/2003 | Harris et al. | | 2009/0177758 A1 | 7/2009 | Banger et al. |
| 2003/0231621 A1 | 12/2003 | Gubbi et al. | | 2009/0199248 A1 | 8/2009 | Ngo et al. |
| 2004/0003406 A1 | 1/2004 | Billmaier | | 2010/0001960 A1 | 1/2010 | Williams |
| 2004/0052216 A1 | 3/2004 | Roh | | 2010/0005483 A1 | 1/2010 | Rao |
| 2004/0068334 A1 | 4/2004 | Tsai et al. | | 2010/0064055 A1 | 3/2010 | Krikorian et al. |
| 2004/0083301 A1 | 4/2004 | Murase et al. | | 2010/0064332 A1 | 3/2010 | Krikorian et al. |
| 2004/0100486 A1 | 5/2004 | Flamini et al. | | 2010/0070925 A1 | 3/2010 | Einaudi et al. |
| 2004/0103340 A1 | 5/2004 | Sundareson et al. | | 2010/0071076 A1 | 3/2010 | Gangotri et al. |
| 2004/0139047 A1 | 7/2004 | Rechsteiner et al. | | 2010/0100915 A1 | 4/2010 | Krikorian et al. |
| 2004/0162845 A1 | 8/2004 | Kim et al. | | | | |
| 2004/0162903 A1 | 8/2004 | Oh | | | | |

FOREIGN PATENT DOCUMENTS

| | | |
|---|---|---|
| DE | 4407319 A1 | 9/1994 |
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| KR | 20010211410 A | 8/2001 |
| KR | 19990082855 A | 2/2010 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 20060074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

| | | | |
|---|---|---|---|
| 2004/0172410 A1 | 9/2004 | Shimojima et al. | |
| 2004/0205830 A1 | 10/2004 | Kaneko | |
| 2004/0212640 A1 | 10/2004 | Mann et al. | |
| 2004/0216173 A1 | 10/2004 | Horoszowski et al. | |
| 2004/0236844 A1 | 11/2004 | Kocherlakota | |
| 2004/0255249 A1 | 12/2004 | Chang et al. | |
| 2005/0021398 A1 | 1/2005 | McCleskey et al. | |
| 2005/0027821 A1 | 2/2005 | Alexander et al. | |
| 2005/0038981 A1 | 2/2005 | Connor et al. | |
| 2005/0044058 A1 | 2/2005 | Matthews et al. | |
| 2005/0050462 A1 | 3/2005 | Whittle et al. | |
| 2005/0053356 A1 | 3/2005 | Mate et al. | |
| 2005/0055595 A1 | 3/2005 | Frazer et al. | |
| 2005/0060759 A1 | 3/2005 | Rowe et al. | |
| 2005/0097542 A1 | 5/2005 | Lee | |
| 2005/0114852 A1 | 5/2005 | Chen et al. | |
| 2005/0132351 A1 | 6/2005 | Randall et al. | |
| 2005/0138560 A1 | 6/2005 | Lee et al. | |
| 2005/0149545 A1* | 7/2005 | Zenz | 707/101 |
| 2005/0198584 A1 | 9/2005 | Matthews et al. | |
| 2005/0204046 A1 | 9/2005 | Watanabe | |
| 2005/0216851 A1 | 9/2005 | Hull et al. | |
| 2005/0227621 A1 | 10/2005 | Katoh | |
| 2005/0229118 A1 | 10/2005 | Chiu et al. | |
| 2005/0246369 A1 | 11/2005 | Oreizy et al. | |
| 2005/0251833 A1 | 11/2005 | Schedivy | |
| 2005/0283791 A1 | 12/2005 | McCarthy et al. | |
| 2005/0288999 A1 | 12/2005 | Lerner et al. | |
| 2006/0011371 A1 | 1/2006 | Fahey | |
| 2006/0031381 A1 | 2/2006 | Van Luijt et al. | |
| 2006/0041881 A1* | 2/2006 | Adkasthala | 717/168 |
| 2006/0050970 A1 | 3/2006 | Gunatilake | |
| 2006/0051055 A1 | 3/2006 | Ohkawa | |
| 2006/0095401 A1 | 5/2006 | Krikorian et al. | |
| 2006/0095471 A1 | 5/2006 | Krikorian et al. | |
| 2006/0095472 A1 | 5/2006 | Krikorian et al. | |
| 2006/0095942 A1 | 5/2006 | Van Beek | |
| 2006/0095943 A1 | 5/2006 | Demircin et al. | |
| 2006/0107226 A1 | 5/2006 | Matthews et al. | |
| 2006/0117371 A1 | 6/2006 | Margulis | |
| 2006/0146174 A1 | 7/2006 | Hagino | |
| 2006/0280157 A1 | 12/2006 | Karaoguz et al. | |
| 2007/0003224 A1 | 1/2007 | Krikorian et al. | |
| 2007/0005783 A1 | 1/2007 | Saint-Hillaire et al. | |
| 2007/0022328 A1 | 1/2007 | Tarra et al. | |
| 2007/0074115 A1 | 3/2007 | Patten et al. | |
| 2007/0076604 A1 | 4/2007 | Litwack | |
| 2007/0168543 A1 | 7/2007 | Krikorian et al. | |
| 2007/0180485 A1 | 8/2007 | Dua | |
| 2007/0198532 A1 | 8/2007 | Krikorian et al. | |
| 2007/0234213 A1 | 10/2007 | Krikorian et al. | |
| 2007/0286596 A1 | 12/2007 | Lonn | |
| 2008/0019276 A1 | 1/2008 | Takatsuji et al. | |
| 2008/0037573 A1 | 2/2008 | Cohen | |
| 2008/0059533 A1 | 3/2008 | Krikorian | |

OTHER PUBLICATIONS

USPTO, Non-Final Office Action, mailed Aug. 4, 2009; U.S. Appl. No. 11/734,277, filed Apr. 12, 2007.

USPTO, Non-Final Office Action, mailed Jul. 31, 2009; U.S. Appl. No. 11/683,862, filed Mar. 8, 2007.

USPTO, Non-Final Office Action, mailed Aug. 5, 2009; U.S. Appl. No. 11/147,663, filed Jun. 7, 2005.

USPTO, Non-Final Office Action, mailed Sep. 3, 2009; U.S. Appl. No. 11/620,711, filed Jan. 7, 2007.

Nandury, Venkata Kishore "Adaptive Gain Control for Digital Audio Samples in a Media Stream," U.S. Appl. No. 12/507,971, filed Jul. 23, 2009.

Malode, Deepak Ravi "Remote Control and Method for Automatically Adjusting the Volume Output of an Audio Device," U.S. Appl. No. 12/550,145, filed Aug. 28, 2009.

Akella, Aparna Sarma "Systems and Methods for Event Programming Via a Remote Media Player," U.S. Appl. No. 12/537,057, filed Aug. 6, 2009.

Shah, Bhupendra Natwerlan et al. "Systems and Methods for Transcoding and Place Shifting Media Content," U.S. Appl. No. 12/548,130, filed Aug. 26, 2009.

Banger, Shashidhar et al. "Systems and Methods for Automatically Controlling the Resolution of Streaming Video Content," U.S. Appl. No. 12/537,785, filed on Aug. 7, 2009.

Panigrahi, Biswaranjan "Home Media Aggregator System and Method," U.S. Appl. No. 12/538,681, filed Aug. 10, 2009.

Lucas, Brian et al. "Systems and Methods for Establishing Connections Between Devices Communicating Over a Network," U.S. Appl. No. 12/426,103, filed Apr. 17, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Australian Government "Office Action," Australian Patent Application No. 2006240518, mailed Nov. 12, 2009.
Thiyagarajan, Venkatesan et al. "Always-On-Top Media Player Launched From a Web Browser," U.S. Appl. No. 12/617,271, filed Nov. 12, 2009.
USPTO, Final Office Action, mailed Nov. 6, 2009; U.S. Appl. No. 09/809,868, filed Mar. 15, 2001.
USPTO, Final Office Action mailed Nov. 12, 2009; U.S. Appl. No. 11/620,707, filed Jan. 7, 2007.
Newton's Telecom Dictionary, 21st ed., Mar. 2005.
European Patent Office, European Search Report, mailed Sep. 28, 2009 for European Application No. EP 06 78 6175.
Paul, John Michael et al. "Systems and Methods for Delivering Messages Over a Network," U.S. Appl. No. 12/619,192, filed Nov. 16, 2009.
USPTO Final Office Action mailed Jan. 25, 2010; U.S. Appl. No. 11/734,277, filed Apr. 12, 2007.
USPTO, Non-Final Office Action mailed Nov. 23, 2009; U.S. Appl. No. 11/683,862, filed Mar. 8, 2007.
International Search Report for PCT/US20081069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
USPTO, Non-Final Office Action mailed Oct. 1, 2009; U.S. Appl. No. 11/778,287, filed Jul. 16, 2007.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
USPTO Final Office Action mailed Dec. 30, 2009; U.S. Appl. No. 11/147,664, filed Jun. 7, 2005.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.

Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
PCT Partial International Search, PCT/US2009/054893, mailed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
Srisuresh, P. et al. "Traditional IP Network Address Translator (Traditional NAT)," Network Working Group, The Internet Society, Jan. 2001.
Paul, John et al. "Systems and Methods for Searching Media Content," U.S. Appl. No. 12/648,024, filed Dec. 28, 2009.
China State Intellectual Property Office "First Office Action," Jan. 8, 2010; Application No. 200810126554.0.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
Gurzhi, Alexander et al. "Systems and Methods for Emulation Network-Enabled Media Components," U.S. Appl. No. 12/711,830, filed Feb. 24, 2010.
Newton's Telcom Dictionary, 20th ed., Mar. 2004.
"The Authoritative Dictionary of IEEE Standard Terms," 7th ed. 2000.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
European Patent Office, European Search Report for European Application No. EP 08 16 7880, mailed Mar. 4, 2009.
MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.

Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.

USPTO, Non-Final Office Action mailed Dec. 17, 2004; U.S. Appl. No. 09/809,868, filed Mar. 15, 2001.

USPTO, Final Office Action mailed Jul. 28, 2005; U.S. Appl. No. 09/809,868, filed Mar. 15, 2001.

USPTO, Non-Final Office Action mailed Jan. 30, 2006; U.S. Appl. No. 09/809,868, filed Mar. 15, 2001.

USPTO, Final Office Action mailed Aug. 10, 2006; U.S. Appl. No. 09/809,868, filed Mar. 15, 2001.

USPTO, Non-Final Office Action mailed Jun. 19, 2007; U.S. Appl. No. 09/809,868, filed Mar. 15, 2001.

USPTO, Non-Final Office Action mailed Apr. 16, 2008; U.S. Appl. No. 09/809,868, filed Mar. 15, 2001.

USPTO, Final Office Action mailed Sep. 18, 2008; U.S. Appl. No. 09/809,868, filed Mar. 15, 2001.

USPTO, Non-Final Office Action mailed Mar. 31, 2009; U.S. Appl. No. 09/809,868, filed Mar. 15, 2001.

USPTO, Non-Final Office Action mailed May 1, 2008; U.S. Appl. No. 11/111,265, filed Apr. 21, 2005.

USPTO, Final Office Action mailed Dec. 29, 2008; U.S. Appl. No. 11/111,265, filed Apr. 21, 2005.

USPTO, Non-Final Office Action mailed Jun. 8, 2009; U.S. Appl. No. 11/111,265, filed Apr. 21, 2005.

USPTO, Non-Final Office Action mailed Jun. 26, 2008; U.S. Appl. No. 11/620,707, filed Jan. 7, 2007.

USPTO, Final Office Action mailed Oct. 21, 2008; U.S. Appl. No. 11/620,707, filed Jan. 7, 2007.

USPTO, Non-Final Office Action mailed Mar. 25, 2009; U.S. Appl. No. 11/620,707, filed Jan. 7, 2007.

USPTO, Non-Final Office Action mailed Aug. 7, 2008; U.S. Appl. No. 11/620,711, filed Jan. 7, 2007.

USPTO, Final Office Action mailed Feb. 9, 2009; U.S. Appl. No. 11/620,711, filed Jan. 7, 2007.

USPTO, Non-Final Office Action mailed Feb. 25, 2009; U.S. Appl. No. 11/683,862, filed Mar. 8, 2007.

USPTO, Non-Final Office Action mailed Dec. 24, 2008; U.S. Appl. No. 11/147,985, filed Jun. 7, 2005.

USPTO, Non-Final Office Action mailed Jun. 25, 2008; U.S. Appl. No. 11/428,254, filed Jun. 30, 2006.

USPTO, Final Office Action mailed Feb. 6, 2009; U.S. Appl. No. 11/428,254, filed Jun. 30, 2006.

USPTO, Non-Final Office Action mailed May 15, 2009; U.S. Appl. No. 11/147,664, filed Jun. 7, 2005.

Sonic Blue "ReplayTV 5000 User's Guide," 2002, entire document.

Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.

Microsoft Corporation; Harman/Kardon "Master Your Universe" 1999.

Matsushita Electric Corporation of America MicroCast: Wireless PC Multimedia Transceiver System, Nov. 1998.

"Wireless Local Area Networks: Issues in Technology and Standards" Jan. 6, 1999.

USPTO, Final Office Action mailed Jun. 25, 2009; U.S. Appl. No. 11/147,985, filed Jun. 7, 2005.

International Search Report and Written Opinion for International Application No. PCT/US20061025912, mailed Jul. 17, 2008.

International Search Report for International Application No. PCT/US2008/059613, mailed Jul. 21, 2008.

International Search Report and Written Opinion for International Application No. PCT/US2008/080910, mailed Feb. 16, 2009.

Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.

Wikipedia "LocationFree Player" [Online], Sep. 22, 2007, XP002512400; retrieved from the Internet: <URL: http://en.wikipedia.org/w/index.php?title=LocationFree__Player&oldid=159683564>; retrieved on Jan. 28, 2009.

Capable Networks LLC "Keyspan Remote Control--- Controlling Your Computer With a Remote" [Online], Feb. 21, 2006, XP002512495; retrieved from the Internet: <URL:http://www.slingcommunity.com/article/11791/Keyspan-Remote-Control—Controlling-Your-Computer-With-a-Remote/?highlight=remote+control>; retrieved on Jan. 28, 2009.

Sling Media Inc. "Slingbox User Guide" [Online] 2006, XP002512553; retrieved from the Internet: <URL:http://www.slingmedia.hk/attach/en-US__Slingbox__User__Guide__v12.pdf>; retrieved on Jan. 29, 2009.

Sony Corporation "LocationFree TV" [Online], 2004, SP002512410; retrieved from the Internet: <URL:http://www.docs.sony.com/release/LFX1__X5revision.pdf>; retrieved on Jan. 28, 2009 [note—document uploaded in two parts as file exceeds the 25MB size limit].

Sony Corporation "LocationFree Player Pak—LocationFree Base Station—LocationFree Player" [Online] 2005, XP002512401; retrieved from the Internet: <URL:http://www.docs.sony.com/release/LFPK1.pdf>, retrieved on Jan. 28, 2009.

USPTO Final Office Action mailed Mar. 3, 2010; U.S. Appl. No. 11/11,265, filed Apr. 21, 2005.

USPTO Final Office Action mailed Mar. 12, 2010; U.S. Appl. No. 11/620,711, filed Jan. 7, 2007.

USPTO Non-Final Office Action mailed Mar. 19, 2010; U.S. Appl. No. 11/147,664, filed Jun. 7, 2005.

USPTO Non-Final Office Action mailed Mar. 31, 2010; U.S. Appl. No. 11/620,707, filed Jan. 7, 2007.

USPTO Non-Final Office Action mailed Apr. 1, 2010; U.S. Appl. No. 12/237,103, filed Sep. 24, 2008.

European Patent Office, International Searching Authority, "International Search Report," mailed Mar. 30, 2010; International Application PCT/US2009/068468 filed Dec. 27, 2009.

International Search Report and Written Opinion, PCT/US2005/020105, Feb. 15, 2007, 6 pages.

International Search Report and Written Opinion for PCT/US2006/04382, mailed Apr. 27, 2007.

Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.

Faucon, B. "Tv 'Brick' Opens up Copyright Can of Worms, "Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path +articles/2003/06/30/0156825330084.html].

Balster, Eric J., "Video Compression and Rate Control Methods Based on the Wavelet Transform," The Ohio State University 2004, pp. 1-24.

Kulapala et al., "Comparison of Traffic and Quality Characteristics of Rate-Controlled Wavelet and DCT Video," Arizona State University, Oct. 11, 2004.

Skodras et al., "JPEG2000: The Upcoming Still Image Compression Standard," May 11, 2000, 14 pages.

Taubman et al., "Embedded Block Coding in JPEG2000," Feb. 23, 2001, pp. 1-8 of 36.

Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.

Roe, Kevin, "Third-Party Observation Under EPC Article 115 On The Patentability of an Invention," Dec. 21, 2007.

Roe, Kevin, Third-Party Submission for Published Application Under CFR §1.99, Mar. 26, 2008.

Kulkarni, Anant Madhava "Systems and Methods for Creating Logical Media Streams for Media Storage and Playback," U.S. Appl. No. 12/323,907, filed Nov. 26, 2008.

Rao, Padmanabha R. "Systems and Methods for Linking Media Content," U.S. Appl. No. 12/359,784, filed on Jan. 26, 2009.

International Search Report for International Application No. PCT/US2007/063599, mailed Dec. 12, 2007.

International Search Report for International Application No. PCT/US2007/076337, mailed Oct. 20, 2008.

International Search Report and Written Opinion for International Application No. PCT/US2006/025911, mailed Jan. 3, 2007.

European Patent Office "European Search Report," mailed May 7, 2010 for Application No. 06786174.0.

Margulis, Neal "Apparatus and Method for Effectively Implementing a Wireless Television System," U.S. Appl. No. 12/758,193, filed Apr. 12, 2010.

Margulis, Neal "Apparatus and Method for Effectively Implementing a Wireless Television System," U.S. Appl. No. 12/758,194, filed Apr. 12, 2010.

Margulis, Neal "Apparatus and Method for Effectively Implementing a Wireless Television System," U.S. Appl. No. 12/758,196, filed Apr. 12, 2010.

Krikorian, Jason Gary et al. "Personal Media Broadcasting System with Output Buffer," U.S. Appl. No. 12/757,697, filed Apr. 9, 2010.

Jain, Vikal Kumar "Systems and Methods for Coordinating Data Communication Between Two Devices," U.S. Appl. No. 12/699,280, filed Feb. 3, 2010.

China State Intellectual Property Office "Office Action," issued Apr. 13, 2010; Application No. 200580026825.X.

Canadian Intellectual Property Office "Office Action" mailed Feb. 18, 2010 for Application No. 2569610.

China State Intellectual Property Office "Office Action" issued Mar. 18, 2010, for Application No. 200680022520.6.

* cited by examiner

FIRMWARE UPDATE FOR CONSUMER ELECTRONIC DEVICE

CROSS REFERENCE TO RELATED APPLICATIONS

This application claims the benefit of U.S. Provisional Application No. 60/696,096, filed Jun. 30, 2005, which is incorporated by reference in its entirety.

BACKGROUND

This invention relates generally to consumer devices having one or more processors, and, more specifically, to updating and loading the firmware stored on such devices.

A number of consumer grade devices that run embedded software have the ability to accept firmware updates that allow the end user to use feature enhancements and to address problem fixes. These updates are often initiated by the user and are typically critical in nature. Failures in the update process are often catastrophic.

A failure could be due to power failure or glitches on the embedded device and/or the host initiating the update. Failures may also result from network interruptions and any number of other problems. When a failure occurs, the firmware on the consumer device is often erased or otherwise corrupted. Because firmware is typically integral to the successful operation of the device, the corruption or loss of the firmware can cause the consumer device to perform improperly, and in some cases, to be completely inoperable. Perhaps worst of all, once the device has been rendered inoperable, it may be impossible or impractical to restore the firmware. Thus, a failure during a firmware upgrade can result in the loss of the consumer device.

Therefore, what is needed is a way to intelligently update the firmware of a consumer device.

SUMMARY OF THE INVENTION

To avoid the problems in previous consumer devices, embodiments of the invention intelligently update the firmware of a consumer device. A back-up application image is stored as firmware on the consumer device. If the primary application image is corrupted, the back-up application image can be executed instead, maintaining at least some of the functionality of the consumer device.

In one embodiment, two or more application images are stored as firmware on the consumer device. A processor executes the first application image. A determination is made as to whether the first application image is corrupt. If the first application image is determined to be corrupt, the processor executes the second application image. By executing the second application image as a back-up, the consumer device is able operate as normal even if the first application image is corrupt. The consumer device may also initiate an update to repair the corrupted application image. Because user configuration files are stored independently of application images, the update can repair the corrupted application image without overwriting user configuration files.

Furthermore, so that the back-up firmware can provide greater functionality, embodiments of the invention update the back-up application image. A processor executes a primary application image stored as firmware on the consumer device. The first application image is updated with an updated application image. If the updated application image is determined to be not corrupt, the updated application image is used to update the back-up application image, which is stored as firmware on the consumer device. The back-up application image is available in case the primary image is subsequently corrupted. In this way, the back-up application image can be safely updated while reducing the likelihood of corrupting the back-up image. By updating the back-up application image, a back-up copy of firmware can be kept up to date with non-corrupt application images.

The first application image can be determined to be corrupt using a variety of methods. According to one embodiment, the first application image can be determined to be corrupt by reading one or more flags to determine if an update was initiated but not completed. An incompletely updated application image is determined to be corrupt. According to another embodiment, a checksum is used to determine if an application image is corrupt.

The features and advantages described in this summary and the following detailed description are not all-inclusive. Many additional features and advantages will be apparent to one of ordinary skill in the art in view of the drawings, specification, and claims hereof.

DETAILED DESCRIPTION OF THE PREFERRED EMBODIMENTS

In one embodiment of the present invention, a back-up application image is stored locally in a consumer device. If the primary application image is corrupted (for example, due to an update failure or a data loss), the back-up application image can be executed instead, maintaining at least some of the functionality of the consumer device. During the execution of the back-up application image, the primary application image can be restored. Storing two application images in the consumer device beneficially increases the failure resistance and reliability of the consumer device.

In one embodiment, the consumer device is a personal media broadcaster, such as the one described in U.S. application Ser. No. 11/147,664, entitled "Personal Media Broadcasting System," filed Jun. 7, 2005, which is incorporated by reference in its entirety. An application image for a personal media broadcaster may include processor instructions causing the media broadcaster to encode a video source and stream it over a local or remote network to a media player. Storing two or more application images as firmware on a personal media broadcaster is particularly beneficial given the typically challenging operating conditions of personal media broadcasters. Personal media broadcasters are often power-cycled without warning, have unreliable connections to the Internet, and are frequently moved, resulting in a high risk of firmware corruption. Furthermore, users often expect that, with minimal user intervention, their personal media broadcasters be up-to-date with continuously improved firmware. The intelligent firmware update described herein advantageously provides reliable firmware updates for a personal media broadcaster operating under even the most challenging of conditions.

Figure 1:
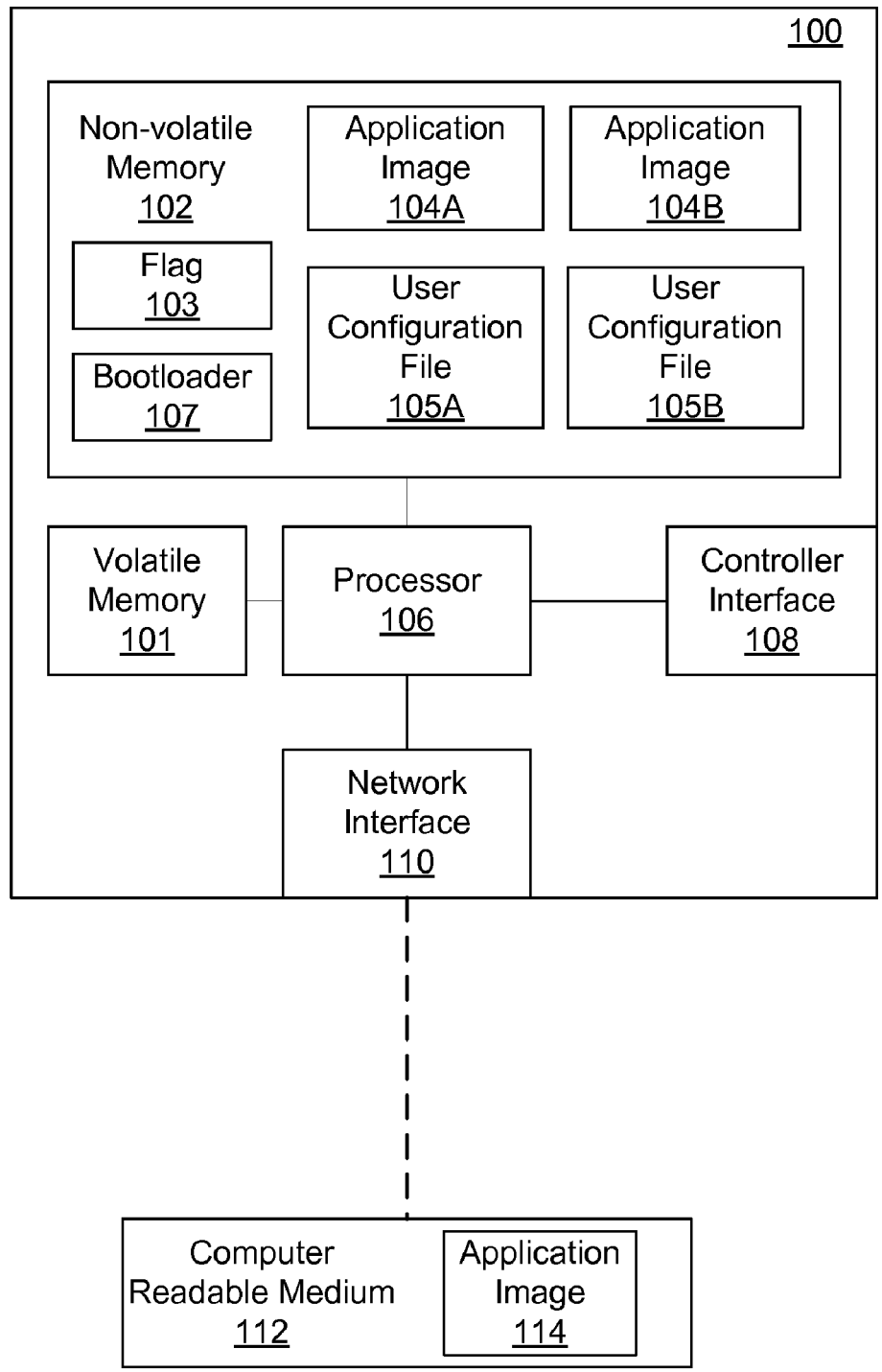
FIG. 1 is a block diagram illustrating a consumer device, according to one embodiment of the present invention.

FIG. 1 is a block diagram illustrating a consumer device, according to one embodiment of the present invention. The consumer device 100 contains a non-volatile memory 102, a volatile memory 101, a processor 106, and at least one interface for receiving firmware updates. For example, the consumer device 100 illustrated in the figure includes a network interface 110 and a controller interface 108. The network interface 110 can be implemented, for example, as an Ethernet card, an 801.11-compliant wireless device, a modem, a cellular modem, or another interface capable of sending and receiving data on a network. Other components not illustrated can also be included in the consumer device 100.

The volatile memory 101 can be implemented as any kind of computer-readable medium. The volatile memory 101 can be implemented, for example, by dynamic or static random access memory. The volatile memory 101 is capable of storing data and processor instructions for the processor 106. Typically, the volatile memory 101 is designed so that it will lose its contents if power to the volatile memory 101 is disconnected, but it need not be.

The non-volatile memory 102 can be implemented as any kind of computer-readable medium that retains its contents when power to the non-volatile memory 102 is disconnected. The non-volatile memory 102 can be implemented, for example, by a disk drive, flash memory, Electrically Erasable Programmable Read-Only Memory (EEPROM), or magnetic, Ovonic Unified, or ferroelectric random access memory. Although the non-volatile memory 102 is illustrated as a single component, the non-volatile memory 102 can be implemented as any number of computer-readable media. When reference is made herein to distinct non-volatile memories, it should be understood that in one embodiment these distinct non-volatile memories are implemented as distinct locations within the same non-volatile memory. In another embodiment, distinct non-volatile memories are implemented as physically separate components of the consumer device 100.

The non-volatile memory 102 stores processor instructions executable by the processor 106. A group of computer instructions is typically organized into a functional program called an application image 104. An application image 104 (sometimes called a "binary image") is a set of processor instructions that, when executed by the processor 106, will cause the consumer device 100 to have its intended functionality. Because the application image 104 is stored embedded in the consumer device 100, the application image 104 is often referred to as "firmware."

The non-volatile memory 102 includes two or more application images, such as application image 104A and application image 104B. Application image 104A and application image 104B are independent and distinct groups of processor instructions. When executed on the processor 106, either application image 104 will allow the consumer device 100 to perform its intended functionality without relying on the other (provided the application image is not corrupt).

The application images 104A and 104B can be identical instruction-for-instruction, or they can be different. For example, application image 104A can be an updated version of the application image 104B, implementing additional functionality of which the application image 104B is not capable. As another example, application image 104A can be corrupt, and application image 104B can be not corrupt.

According to one embodiment of the present invention, the application image 104A is stored on a first non-volatile memory and the application image 104B is stored on a second non-volatile memory. The first non-volatile memory and the second non-volatile memory can be implemented, for example, as separate locations on a single component of non-volatile memory 102. As another example, the first non-volatile memory and the second non-volatile memory can be implemented as distinct components of non-volatile memory. In FIG. 1, the first and second non-volatile memories are implemented in a single physical non-volatile memory 102.

The non-volatile memory 102 may also contain one or more user configuration files 105. A user configuration file 105 comprises data stored on a computer-readable medium that indicates user preferences for the operation of the consumer device 100. According to one embodiment of the present invention, the memory 102 contains two or more user configuration files 105A and 105B, each configuration file 105 associated with an application image 104. While an application image 104 is executing on the processor, the user configuration file 105 associated with that application image 104 is considered the active user configuration file for the consumer device 100.

According to one embodiment of the present invention, the non-volatile memory 102 contains one or more flags 103 indicating whether an update of the application image 104A has been initiated and whether the update of the application image 104A was completed. Additional flags can also be implemented to indicate the update or corruption status of other application images, configuration files, and so on.

According to one embodiment of the present invention, the non-volatile memory 102 contains a bootloader 107. The bootloader 107 is a set of processor instructions for initializing the consumer device 100 and beginning the execution of one of the application images 104.

The volatile memory 101 and the non-volatile memory 102 have been illustrated as separate components for the purpose of illustration, but various embodiments of the invention are not limited to such a configuration. In one embodiment, the data structures described as being stored on the volatile memory 101 and the data structures described as being stored on the non-volatile memory 102 are stored on a common memory. Furthermore, the examples of volatile and non-volatile memories described herein are given for the purposes of illustration and are not limiting. Other examples of volatile and non-volatile memory will be apparent to one of skill in the art without departing from the scope of the present invention.

Figure 2:
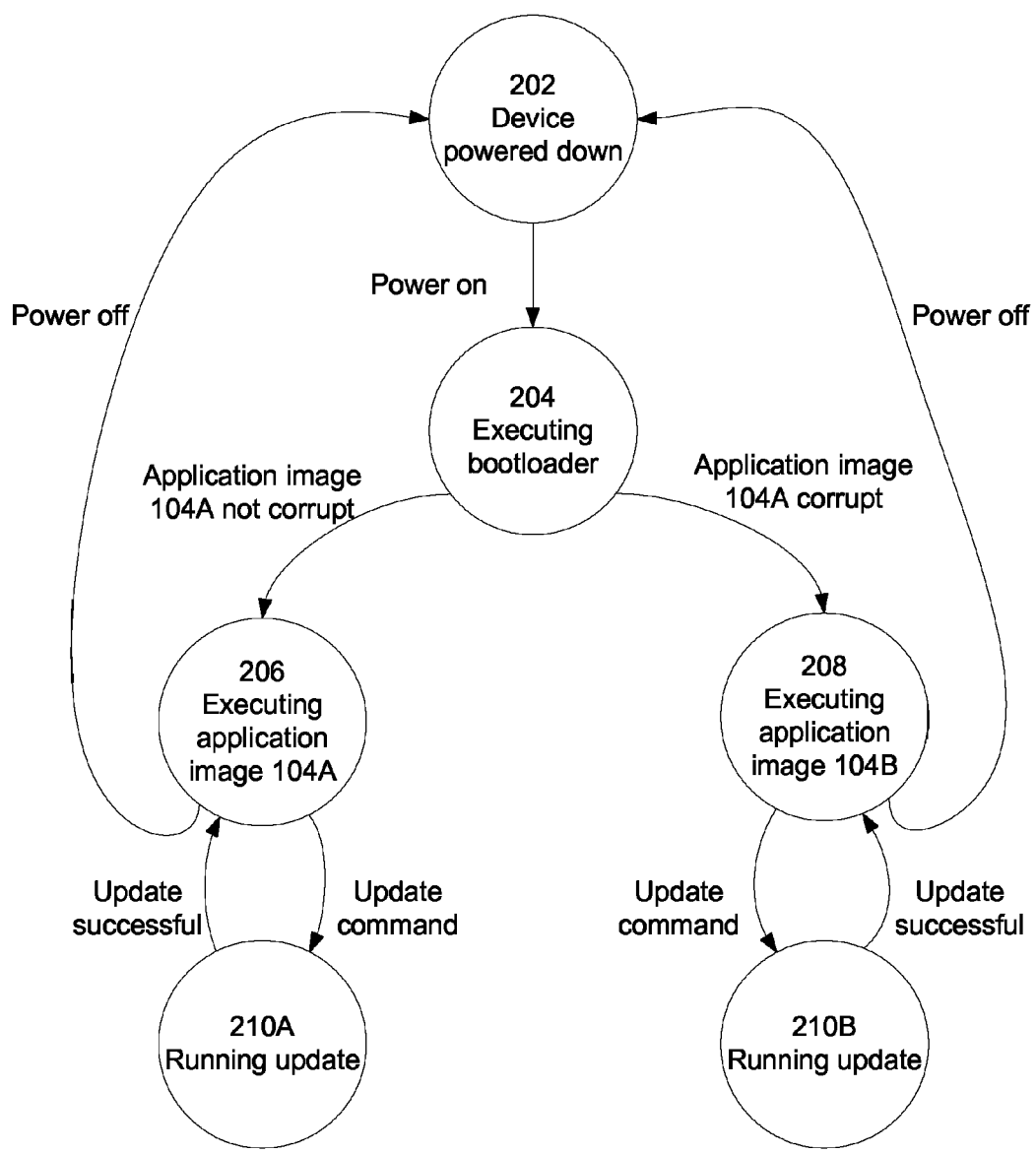
FIG. 2 is a state diagram illustrating the execution of a plurality of application images, according to one embodiment of the present invention.

FIG. 2 is a state diagram illustrating the execution of a plurality of application images, according to one embodiment of the present invention. The consumer device 100 begins in a powered down state 202. When the consumer device 100 is in the powered down state 202, the processor 106 does not execute processor instructions. In some embodiments, data stored on the volatile memory 101 is lost when the consumer device 100 is in the powered down state 202.

Power on brings the consumer device 100 to an executing bootloader state 204. In the executing bootloader state 204, the consumer device 100 initializes and determines which application image 104 to load. In one embodiment, the application image 104A serves as a primary application image, and the application image 104B serves as a back-up application image, available for execution if the application image 104A is determined to be corrupt. Under normal conditions, the application images 104A is selected. If the application image 104A is determined 204 to be corrupt, the application image 104B is selected instead.

According to one embodiment of the present invention, in the executing bootloader state 204 the consumer device 100 copies the selected application image 104 from the non-volatile memory 102 to the volatile memory 101.

If the application image 104A is determined to be not corrupt, the consumer device 100 enters the executing application image 104A state 206. The processor instructions of application image 104A are executed by the processor. In state 206, the user configuration file associated with either the application image 104A is used as the active user configuration file.

If the application image 104A is determined to be corrupt, the consumer device 100 enters the executing application image 104B state 208. The processor instructions of application image 104B are executed by the processor. In state 208, the user configuration file associated with either the application image 104A or the application image 104B is used as the active user configuration file, according to various embodiments. According to one embodiment of the present invention, in state 208 the consumer device 100 determines if the user configuration file associated with application image 104A is corrupt. If the user configuration file associated with application image 104A is not corrupt, it is the active user configuration file. If the user configuration file associated with application image 104A is corrupt, another user configuration file is the active user configuration file.

A command to update the firmware causes the consumer device 100 to enter the running update state 210. In state 210, the consumer device 100 receives an updated application image 114 and stores the updated application image in the non-volatile memory 102. The successful completion of the update returns the consumer device 100 to the executing application image state. According to one embodiment of the present invention, at the successful completion of the update, the consumer device 100 restarts, causing the consumer device 100 to return to the powered down state 202.

Power-cycling the consumer device 100 during any state restarts the consumer device 100 and causes the consumer device 100 to return the powered down state 202. For example, if power is inadvertently removed in the running update state 208B, the consumer device 100 returns to the powered down state 202, even though the update of the application image 104 might not be complete.

Figure 3:
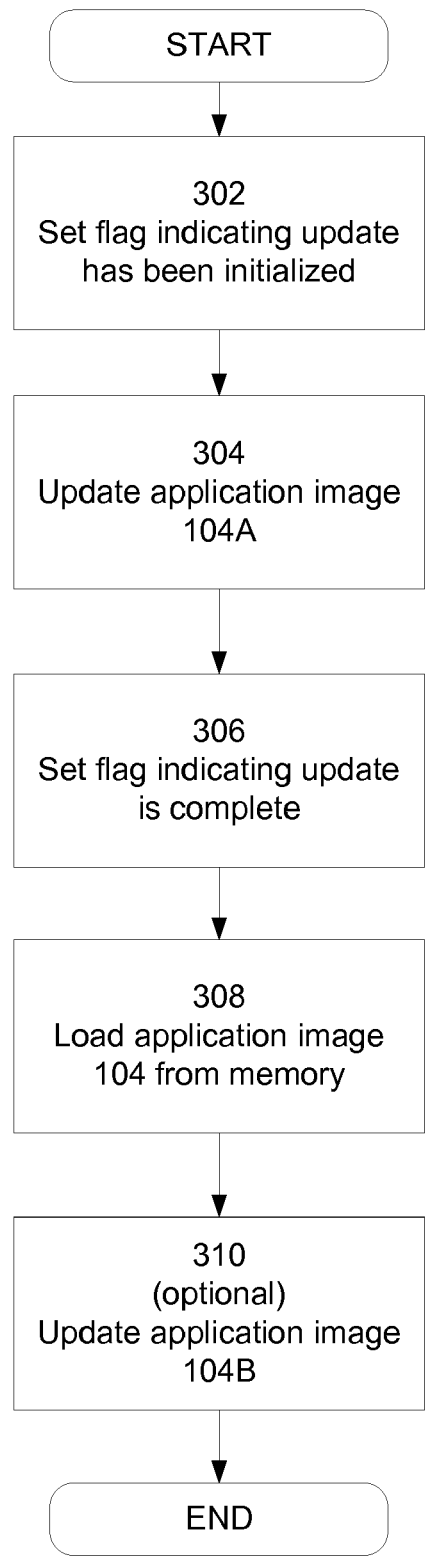
FIG. 3 is a flow chart illustrating a method for updating an application image, according to one embodiment of the present invention.

FIG. 3 is a flow chart illustrating a method for updating an application image, according to one embodiment of the present invention. An updated application image is used to update the primary application image.

Updated application images can be obtained from a variety of sources, either local or remote. Typically, an application image 114 for update is stored on a computer readable medium 112 external to the consumer device 100. The consumer device 100 can access the computer readable medium 112 through the network interface 110 (for example, to access an application image stored on a local or remote server), the controller interface 108 (for example, to access a disk drive or USB port) or any other suitable mechanism. Various methods for obtaining an application image 114 for update will be apparent to one of skill in the art without departing from the scope of the present invention. Typically, updating the application image 104A includes copying the application image 114 to the non-volatile memory 102 storing the application image 104A or 104B.

An update of an application image can be initiated, for example, by a local or remote user command, or it can be initiated automatically in response to determining that the application image is corrupt, or in response to determining that an updated application image is available. For the purposes of illustration, the method is described for updating the application image 104A, but according to various embodiments, the method can also be used to update other application images 104 stored as firmware on the consumer device 100. According to one embodiment of the present invention, the update is performed by the consumer device 100.

The consumer device 100 optionally sets 302 a flag indicating that an update of the application image has been initiated. According to one embodiment of the present invention, a flag is used to indicate that an application image update has been initiated and/or completed. If the update process is interrupted or for any reason does not complete, the flag will reflect the interruption and facilitate determining that the application image 104A is corrupt.

The consumer device 100 updates 304 the application image 104A. According to one embodiment of the present invention, updating 304 the application image 104A includes modifying or replacing the processor instructions of the application image 104A with processor instructions of an application image 114 stored on a computer readable medium 112 external to the consumer device 100. For example, using a local or network connection, the consumer device 100 can copy the application image 114 to the non-volatile memory 102 that previously stored the application image 104A. The non-volatile memory 102 that previously stored the application image 104A now stores an updated application image. According to one embodiment of the present invention, the consumer device 100 copies the application image 114 to the non-volatile memory 102 in 64-kilobyte segments and verifies that each segment was copied correctly into the non-volatile memory 102 before proceeding to the next segment.

According to one embodiment of the present invention, updating 304 the application image 104A includes copying the application image 104B to the non-volatile memory 102 that previously stored the application image 104A. The non-volatile memory 102 that previously stored the application image 104A now stores a recovered application image. Such a recovery can be useful, for example, if the user would like to return the consumer device 100 to a previous firmware version, or to standard factory settings. According to one embodiment of the present invention, the user can initiate a "hard reset" update that will copy the application image 104B to the non-volatile memory 102 that previously stored the application image 104A. Hard resets can be initiated, for example, by a software command, by a hardware button on the consumer device 100, or both.

Updating 304 the application image 104A can include overwriting the user configuration file associated with the application image 104A, or it can preserve the user configuration file. Preserving the user configuration file beneficially allows a user to enjoy the functionality of the consumer device 100 without reconfiguration.

The consumer device 100 optionally sets 306 a flag indicating that an update of the application image is complete. According to one embodiment of the present invention, a flag is used to indicate that an application image update has been initiated and/or completed. Setting 306 the flag indicating that the update is complete beneficially facilitates determining that the updated application image is not corrupt.

The consumer device 100 loads 308 an application image 104 from the non-volatile memory 102. For example, the consumer device 100 can restart and load an application image 104 as in a typical start-up event. A method for loading an application image 104, according to one embodiment of the present invention, is described herein with reference to FIG. 4. In one embodiment, loading 308 an application image includes determining if the application image 104A is corrupt. If the application image 104A is determined to be corrupt, the consumer device 100 can automatically restart the update of the application image 104A.

The consumer device 100 optionally updates 310 application image 104B. According to one embodiment of the present invention, certain application image updates can be designated as capstone updates which update both a primary application image and a back-up application image. Updating 310 application image 104B can include setting a flag indicating that an update of application image 104B has been initiated, copying the updated application image to the non-volatile memory 102 previously storing application image 104B, and setting a flag indicating that an update of the application image 104B is complete. Updating application image 104B can further include associating application image 104B with an updated user configuration file, such as the user configuration file previously associated with application image 104A.

Updating 310 application image 104B beneficially adds features and improvements to the back-up application image, so that the functionality of the consumer device 100 when the back-up application image is loaded will be similar to the functionality when the updated application image is loaded. Furthermore, by updating 310 application image 104B after application image 104A has been successfully updated and loaded, corruption of the application image 104B can be avoided, increasing the reliability of the consumer device 100.

Figure 4:
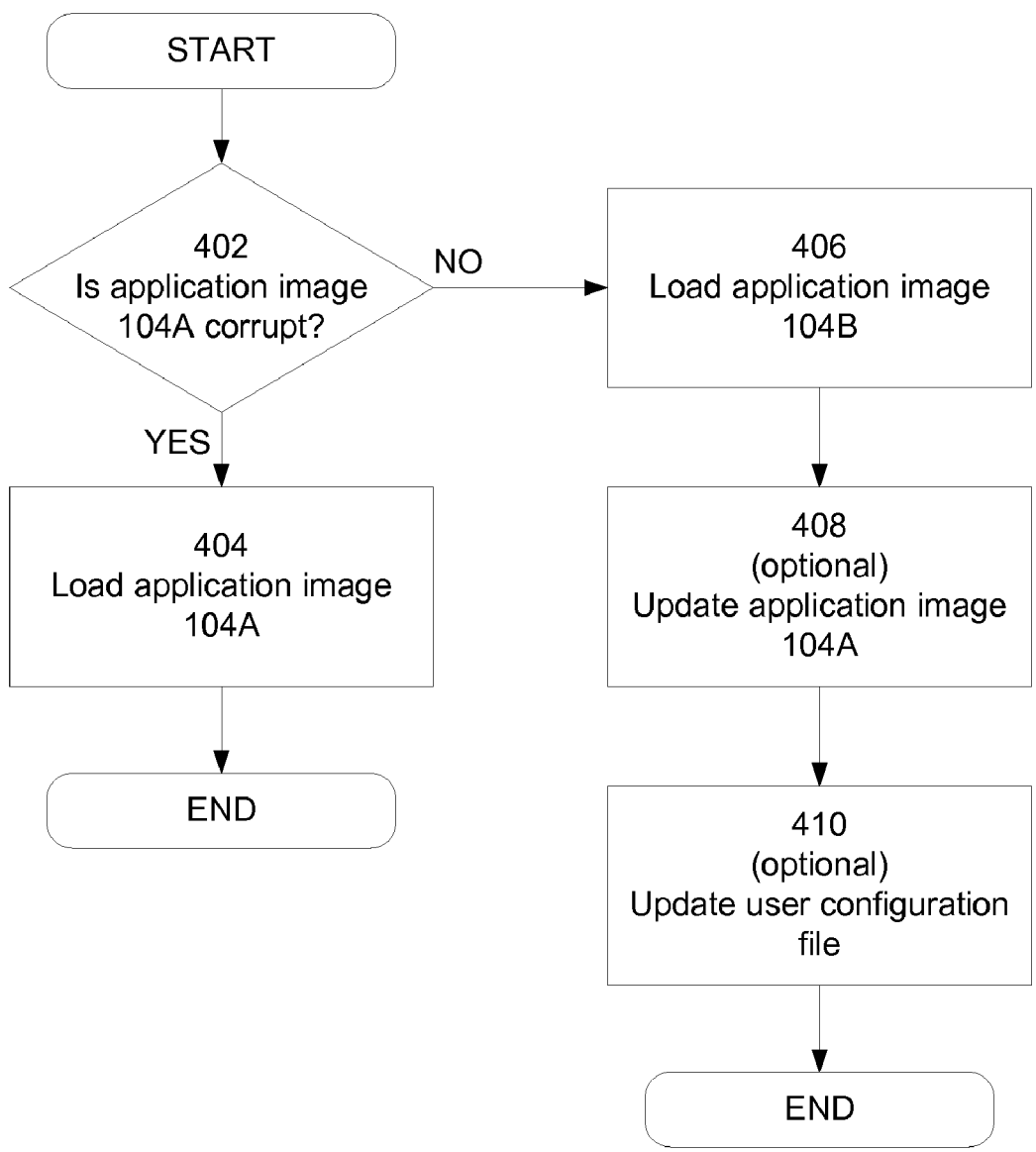
FIG. 4 is a flow chart illustrating a method for loading an application image, according to one embodiment of the present invention.

FIG. 4 is a flow chart illustrating a method for loading an application image, according to one embodiment of the present invention. The consumer device 100 loads an application image as part of the start-up process.

Upon a start-up event, such as a power cycle or a restart, the processor 106 executes the processor instructions of the bootloader 107. The processor instructions of the bootloader 107 cause the consumer device 100 to load an application image 104 and begin executing the processor instructions of the loaded application image 104.

The consumer device 100 determines 402 if the application image 104A is corrupt. According to one embodiment of the present invention, the consumer device 100 determines 402 if the application image 104A is corrupt by determining a checksum of the first application image 104A. If the checksum does not match an expected value, the application image 104A is determined 402 to be corrupt. According to another embodiment of the present invention, the consumer device 100 determines if the application image 104A is corrupt by reading a flag to determine if an update of the application image 104A has been initiated. If reading the flag indicates that the application image 104A has been initiated, but not completed, the application image 104A is determined 402 to be corrupt. According to yet another embodiment of the present invention, the determination 402 can include a combination of reading a flag to determine if an update of the application image 104A has been initiated and determining a checksum. These examples of methods for determining if the application image 104A is corrupt are given for the purposes of illustration only and are not limiting. Other examples of method for determining 402 if the application image 104A is corrupt will be apparent to one of skill in the art without departing from the scope of the present invention.

If the consumer device 100 determines 402 that the application image 104A is not corrupt, the consumer device 100 loads 404 application image 104A. According to one embodiment of the present invention, loading 404 application image 104A includes copying application image 104A from a first non-volatile memory 102 to a volatile memory 101. The processor 106 begins executing the processor instructions of application image 104A. Loading and executing a non-corrupt application image 104A beneficially allows the consumer device 100 to operate with a primary firmware image, providing the functionality and reliability to which the user is accustomed.

If the consumer device 100 determines 402 that the application image 104A is corrupt, the consumer device 100 loads 406 the application image 104B. For example, the consumer device 100 can load 406 the application image 104B by copying the image 104B to the volatile memory 101. As another example, the consumer device 100 can load 406 the application image 104B by copying the image 104B to the volatile memory 101 and to the non-volatile memory 102 that previously stored application image 104A. The processor 106 begins executing the processor instructions of application image 104B.

Loading and executing application image 104B beneficially allows the consumer device 100 to operate with its intended functionality, even when application image 104A is corrupt. In some cases such as when the application image 104A is a more recent firmware version than the application image 104B, certain advanced functionality may be reduced or modified during the execution of the application image 104B.

According to one embodiment of the present invention, the consumer device 100 updates 408 application image 104A. If the application image 104A is determined 402 to be corrupt, the consumer device 100 initiates an update to repair the application image 104A. The update of the application image 104A can start automatically, or a message can be presented to a user indicating that the primary application image is corrupt and prompting the user for a command to initiate an update.

According to one embodiment of the present invention, an update of an application image can operate in at least two modes, one that will preserve the user configuration file associated with application image 104A, and another that will overwrite the user configuration file. According to one embodiment of the present invention, the consumer device 100 determines whether the user configuration file should be overwritten. For example, if the consumer device 100 is updating the application image 104A in response to determining that the application image 104A is corrupt, the user configuration file would not be overwritten. As another example, if the consumer device 100 is updating the application image 104A in response to a user-initiated hard-reset, the user configuration file would be overwritten, for example, with the user configuration file associated with application image 104B. Updating the user configuration file advantageously allows user preferences to be reset to previous or default settings, enabling the consumer device 100 to recover from potentially inoperable user settings.

In the figure and accompanying description, reference is made to performing various actions, such as determining corruption, loading, and updating, on application images. For the purpose of illustration, such actions are discussed with reference to application images 104A and 104B. However, according to various embodiments, the steps described herein can also be performed on other application images. For example, the method described herein with reference to FIG. 4 can also be performed on updated and/or recovered application images.

Where reference is made herein to a primary embodiment containing two distinct application images 104, this discussion has been provided for the purposes of illustration and is not limiting. One of skill in the art will appreciate that further benefits are achieved by storing more than two distinct application images 104 in the consumer device 100. Such benefits include, but are not limited to, further increased failure resistance, user selection of a plurality of firmware versions, and redundant application image back-up. The methods and systems described herein can also be modified to implement embodiments with more than two application images, as will be will be apparent to one of skill in the art without departing from the scope of the present invention.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A method to operate a consumer device having a processor, the method comprising:
   initially creating user configuration data that maintains user-selected preferences for the operation of the consumer device while the processor executes a first application image;
   updating the first application. image with a second application image;
   determining if the updating of the first application image was successful; and
   if the updating of the first image was successful, preserving the user-selected preferences contained in the user configuration data for continued use during subsequent operation of the consumer device while the processor executes the second application image; and
   if the updating of the first image was not successful, resetting the user configuration data and continuing to use the first application image during subsequent operation of the consumer device.

2. The method of claim 1 wherein the resetting comprises restoring default settings for the user configuration data.

3. The method of claim 1 wherein the resetting comprises obtaining new user configuration data from the user.

4. The method of claim 1 wherein the updating comprises simultaneously storing the first application image and the second application image on the consumer device and selecting one of the first and the second application images to execute on the processor, wherein the selecting comprises:
   determining if the second application image is corrupt;
   executing the second application image on the processor if the second application image is not corrupt: and
   executing the first application image on the processor if the second application image is corrupt.

5. The method of claim 1, wherein the updating comprises setting a flag indicating that an update of the first application image has been initiated and storing the flag in a memory of the consumer device.

6. The method of claim 5, wherein the determining comprises reading the flag to determine if an update of the first application image was initiated but not completed.

7. The method of claim 5, wherein the determining comprises verifying a checksum of the second application image.

8. A method to operate a placeshifting device having a processor and a network interface, the method comprising:
   while the processor is executing a first application image, creating and storing user configuration data that describes user-selected preferences for the operation of the placeshifting device;
   downloading a second application image via the network interface;
   determining if the downloading of the second application image was successful; and
   if the downloading of the second image was successful, preserving the user-selected preferences contained in the user configuration data for continued use during subsequent operation using the second application image; and
   if the downloading of the second image was not successful, resetting the user configuration data and continuing to operate the placeshifting device using the first application image.

9. The method of claim 8 further comprising resetting the user configuration data when the user performs a hard reset of the placeshifting device.

10. The method of claim 8 wherein the placeshifting device processes television programming, and wherein the user configuration data comprises an indication of the television programming that is available to the placeshifting device.

11. The method of claim 8 wherein the user configuration data comprises network configuration information that allows the placeshifting device to communicate using the network interface.

12. The method of claim 8 wherein the user configuration data indicates user interface parameters for providing user inputs to the placeshifting device.

13. The method of claim 8 further comprising resetting the user configuration data and downloading the second image in response to a user-initiated hard reset of the placeshifting device.

14. A consumer device comprising:
   a processor;
   a network interface to the network; and
   a memory, said memory configured to store a first application image, user configuration data, and a bootloader;
   wherein the user configuration data maintains preferences for the operation of the consumer device based upon user inputs received while the first application image was executing on the processor; and
   wherein the bootloader is configured to download a second application image via the network interface to the memory, to determine if the download of the second application image was successful, to direct the processor to continue using the user configuration data during subsequent operation of the second application image if the download was successful, and to direct the processor to reset the user configuration data and to continue using the first application image if the download was not successful.

15. The system of claim 14 wherein the memory comprises a first non-volatile portion configured to store the first application image and a second non-volatile portion configured to store the second application image.

16. The system of claim 15 wherein the memory further comprises a volatile portion configured to store a copy of one of the first and the second application images for execution by the processor.

17. The system of claim 16 wherein the bootloader is further configured to determine which of the first and the second application images to copy to the volatile portion of the memory.

18. The system of claim 16 wherein the bootloader is further configured to determine if the second application image is corrupt, to copy the second application image to the volatile portion of the memory if the second application image is not corrupt, and to copy the first application image to the volatile portion of the memory if the second application image is corrupt.

19. The method of claim 14, wherein the bootloader is further configured to determine if the download was successful by checking a flag in the memory that indicates that the download was initiated but not completed.

20. The method of claim 14, wherein the bootloader is further configured to determine if the download was successful by verifying a checksum of the second application image.

* * * * *